United States Patent
Lee et al.

(10) Patent No.: US 12,247,267 B2
(45) Date of Patent: Mar. 11, 2025

(54) METHOD OF PRODUCING LITHIUM HYDROXIDE FROM LITHIUM CONCENTRATE THROUGH SODIUM SULFATE ADDITION AND ROASTING

(71) Applicant: ECOPRO INNOVATION CO., LTD., Chungcheongbuk-do (KR)

(72) Inventors: Min-Woo Lee, Chungcheongbuk-do (KR); Suk-Joon Park, Chungcheongbuk-do (KR); Myung Gyu Lee, Gyeonggi-do (KR); Kwang Seok Lee, Chungcheongbuk-do (KR); Jong Sun Park, Chungcheongbuk-do (KR); Da-Mo-A Kim, Chungcheongnam-do (KR)

(73) Assignee: ECOPRO INNOVATION CO., LTD., Chungcheongbuk-do (KR)

( * ) Notice: Subject to any disclaimer, the term of this patent is extended or adjusted under 35 U.S.C. 154(b) by 834 days.

(21) Appl. No.: 17/299,632

(22) PCT Filed: Nov. 4, 2019

(86) PCT No.: PCT/KR2019/014863
§ 371 (c)(1),
(2) Date: Jun. 3, 2021

(87) PCT Pub. No.: WO2020/116795
PCT Pub. Date: Jun. 11, 2020

(65) Prior Publication Data
US 2022/0017991 A1     Jan. 20, 2022

(30) Foreign Application Priority Data
Dec. 6, 2018 (KR) .................. 10-2018-0156174

(51) Int. Cl.
C22B 26/12 (2006.01)
C01D 15/02 (2006.01)
(Continued)

(52) U.S. Cl.
CPC .............. *C22B 26/12* (2013.01); *C01D 15/02* (2013.01); *C22B 1/06* (2013.01); *C22B 3/04* (2013.01)

(58) Field of Classification Search
None
See application file for complete search history.

(56) References Cited

FOREIGN PATENT DOCUMENTS

| CN | 104649302 | * | 5/2015 |
| CN | 107200338 | * | 9/2017 |

(Continued)

OTHER PUBLICATIONS

IKA "Stirring". https://www.ikaprocess.com/en/Stirring-appl-2.html Feb. 4, 2011 (Year: 2011).*

(Continued)

*Primary Examiner* — Sheng H Davis
(74) *Attorney, Agent, or Firm* — Mendelsohn Dunleavy, P.C.

(57) ABSTRACT

The present invention relates to a method of producing lithium hydroxide from a lithium concentrate through sodium sulfate addition and roasting. The method effectively recover lithium ions from the lithium concentrate, minimizes production of byproducts, and produces high-purity lithium hydroxide. By mixing a concentrate containing lithium with sodium sulfate ($Na_2SO_4$), roasting the concentrate, and leaching the roasted concentrate with water, it is possible to recover lithium ions at a high recovery rate and to produce high-purity lithium hydroxide monohydrate.

9 Claims, 2 Drawing Sheets

(51) Int. Cl.
　　　*C22B 1/06*　　　(2006.01)
　　　*C22B 3/04*　　　(2006.01)

(56) References Cited

FOREIGN PATENT DOCUMENTS

| | | | |
|---|---|---|---|
| CN | 107758705 | * | 3/2018 |
| CN | 107892315 | * | 4/2018 |
| CN | 107986301 | * | 5/2018 |
| CN | 108658099 | * | 10/2018 |
| KR | 1020140019622 A | | 2/2014 |
| KR | 1020160136314 A | | 11/2016 |
| KR | 1020170088873 A | | 8/2017 |
| KR | 1020170107546 A | | 9/2017 |
| KR | 1020180088787 A | | 8/2018 |

OTHER PUBLICATIONS

Yan "Extraction of valuable metals from lepidolite". Hydrometallurgy. 116-118 (2012). (Year: 2012).*
Chemical Process Equipment. 2nd Ed. 277-328 (2005). https://www.sciencedirect.com/science/article/pii/B9780750675109500425 (Year: 2005).*
ChemicalAid $Li_2O + NaOH \rightarrow LiOH + Na_2O$ balanced chemical equation. (Year: 2024).*

* cited by examiner

METHOD OF PRODUCING LITHIUM HYDROXIDE FROM LITHIUM CONCENTRATE THROUGH SODIUM SULFATE ADDITION AND ROASTING

TECHNICAL FIELD

The present invention relates to a method of producing lithium hydroxide from a lithium concentrate through sodium sulfate addition and roasting. More particularly, the present invention relates to a method of producing lithium hydroxide from a lithium concentrate through sodium sulfate addition and roasting, the method being capable of recovering lithium ions with a high recovery rate and of producing high-purity lithium hydroxide monohydrate by performing sodium sulfate addition and roasting followed by water leaching.

BACKGROUND ART

With recent rapid growing demand for small home appliances, IT devices, electric vehicles (EV), energy storage systems (ESSs), etc., the demand for lithium-ion batteries characterized by lightness, high energy density, and high capacity has increased.

A lithium-ion battery is composed of a cathode material, an anode material, a separator, an electrolyte, and the like. The typical cathode material of a lithium-ion secondary battery is lithium oxide in which valuable metals such as nickel, cobalt, and manganese are contained. In the cathode material, lithium oxide serves as an active material, and lithium ions in the lithium oxide function to store and supply electrical energy when the lithium-ion secondary battery is charged and discharged.

In recent years, the demand for lithium hydroxide and lithium carbonate used for production of lithium-ion batteries has rapidly grown, and the development of technology for efficiently recovering lithium from lithium concentrates which are limited natural resources has been strongly required.

The existing technology of recovering lithium from lithium concentrates includes: roasting lithium concentrates with sulfuric acid; leaching the resulting mixture with water to produce a lithium sulfate solution; conversion into lithium carbonate; and conversion into lithium hydroxide for recovery of lithium.

The existing technology for obtaining lithium from lithium concentrates essentially involves treatment of acidic wastewater due to the use of sulfuric acid and conversion of lithium carbonate into lithium hydroxide. Therefore, the existing technology has the problems of requiring treatment of by-products and increasing operational costs. Provided is a method of preparing lithium hydroxide from a lithium concentrate through sodium sulfate addition and roasting.

DISCLOSURE

Technical Problem

The present invention has been made to solve the problems occurring in the related art, and an objective of the present invention is to provide a method of producing lithium hydroxide from a lithium concentrate through sodium sulfate addition and roasting, the method being capable of efficiently recovering lithium ions from the lithium concentrate and of producing high-purity lithium hydroxide while minimizing production of by-products.

Technical Solution

In order to accomplish the objective of the present invention, there is provided a method of producing lithium hydroxide from a lithium concentrate through sodium sulfate addition and roasting, the method including: a lithium concentrate preparation step of preparing a concentrate containing lithium; a mixing and roasting step of mixing the lithium concentrate with sodium sulfate and roasting the mixture; a water leaching step of leaching the roasted mixture with water under stirring; a solid-liquid separation step of separating the water-leached mixture into a leachate and residues; a concentration step of concentrate the leachate in which lithium is dissolved to produce a concentrated solution; a sodium hydroxide mixing step of adding sodium hydroxide (NaOH) to the concentrated solution and stirring the mixture; a cooling crystallization step of cooling the sodium hydroxide mixture to precipitate sodium sulfate crystals using a change in solubility; a lithium hydroxide solution recovery step of recovering a lithium hydroxide solution by the mixture resulting from the cooling crystallization into a precipitate and the lithium hydroxide solution; a concentration crystallization step of concentrating the lithium hydroxide solution to crystallize lithium hydroxide and of recovering lithium hydroxide monohydrate crystals; and a washing and drying step of water-washing and drying the lithium hydroxide monohydrate crystals to recover lithium hydroxide monohydrate.

The lithium concentrate is preferably at least one material selected from the group consisting of spodumene ($Li_2O Al_2O_3 4SiO_2$), lepidolite ($KLiAl(OH,F)_2Al(SiO_4)_3$), petalite ($LiAl(Si_2O_5)_2$), amblygonite ($LiAl(F,OH)PO_4$), zinnwaldite ($Li_2K_2Fe_2Al_4Si_7O_{24}$) triphylite ($Li(Fe,Mn)PO_4$) and lithiophilite($Li(Mn,Fe)PO_4$).

The mixing and roasting step may involve a reaction represented by $2LiAlSi_2O_6 + Na_2SO_4 \rightarrow Li_2SO_4 + 2NaAlSi_2O_6$ (Reaction Formula 1). In this step, heat treatment may be preferably performed at a temperature in a range of 850° C. to 1300° C. for 20 to 300 minutes.

In the water leaching step, water may be used for leaching, instead of an acid. In this case, the amount of water that is added may be about one to 100 times the mass of the resultant products of the mixing and roasting step. During this step, the stirring may be performed at a temperature in a range of 20° C. to 100° C. at a rotation speed in a range of 200 to 1000 rpm for 1 to 5 hours.

In the concentration step, the leachate may be evaporated for 30 minutes to 10 hours at a temperature in a range of 60° C. to 120° C. in a vacuum condition such that the concentration of lithium becomes 16 g/L to 30 g/L In the sodium hydroxide mixing step, sodium hydroxide (NaOH) may be added to the concentrated solution, and the resulting mixture may be stirred for 15 minutes to 2 hours at a temperature in a range of 20 to 100° C. such that the sodium hydroxide can be completely dissolved.

In the cooling crystallization step, the sodium hydroxide mixture may be cooled to a temperature in a range of 10° C. to −10° C. and stirred for 15 minutes to 10 hours such that sodium sulfate decahydrate crystals ($Na_2SO_4 \cdot 10H_2O$) precipitate.

In the lithium hydroxide solution recovery step, the mixture resulting from the cooling crystallization step may be maintained at a temperature in a range of room temperature to −10° C. so that the mixture is separated into a precipitate and a lithium hydroxide solution.

In the concentration crystallization step, the lithium hydroxide solution may be evaporated at a temperature in a range of 60° C. to 120° C. for 30 minutes to 10 hours to precipitate lithium hydroxide monohydrate, and the lithium hydroxide monohydrate in the form of crystals may be recovered.

In the washing and drying step, the lithium hydroxide monohydrate crystals may be washed with water and then dried. Thus, lithium hydroxide monohydrate that is a target product is recovered.

Advantageous Effects

The method of producing lithium hydroxide from a lithium concentrate through sodium sulfate addition and roasting, according to the present invention, has the advantage of recovering lithium with a high recovery rate by adding sodium sulfate to the lithium concentrate, roasting the mixture, and leaching the roasted mixture with water.

In addition, the method of producing lithium hydroxide from a lithium concentrate through sodium sulfate addition and roasting, according to the present invention, has the advantage of efficiently producing high-purity lithium hydroxide monohydrate because the method can selectively extract lithium ions from lithium concentrates without using an acid solution.

In addition, the method of producing lithium hydroxide through sodium sulfate addition and roasting, according to the present invention, has the advantage of not requiring conversion of a lithium sulfate solution produced through water leaching into lithium concentrate and the advantage of recycling sodium sulfate that is a by-product during conversion of lithium sulfate into lithium hydroxide in the preceding stage (i.e., state in which lithium concentrate is mixed with sodium sulfate and the mixture is roasted).

MODE FOR INVENTION

The invention relates to a method of producing lithium hydroxide from lithium concentrates through sodium sulfate addition and roasting. The method mixes a concentrate containing lithium with sodium sulfate, roasts the resulting mixture, and leaches the resulting slurry with water. Therefore, the method exhibits a high lithium recovery ratio and produces high-purity lithium hydroxide while minimizing production of by-products.

Hereinafter, the preferred embodiments of the present invention will be described in detail with reference to the accompanying drawings. However, the present invention is not limited to the embodiments described herein and may be embodied in other forms.

Figure 1:
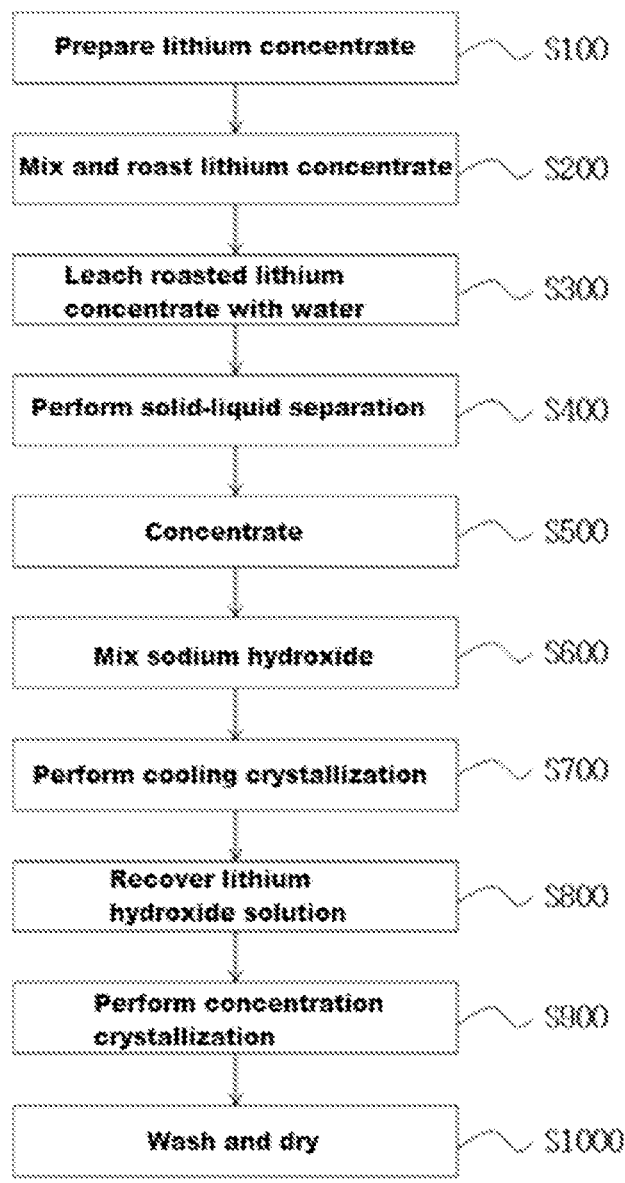
FIG. 1 is a flowchart illustrating a method of producing lithium hydroxide from lithium concentrates through addition of sodium sulfate and roasting, according to one embodiment of the present invention.
Figure 2:
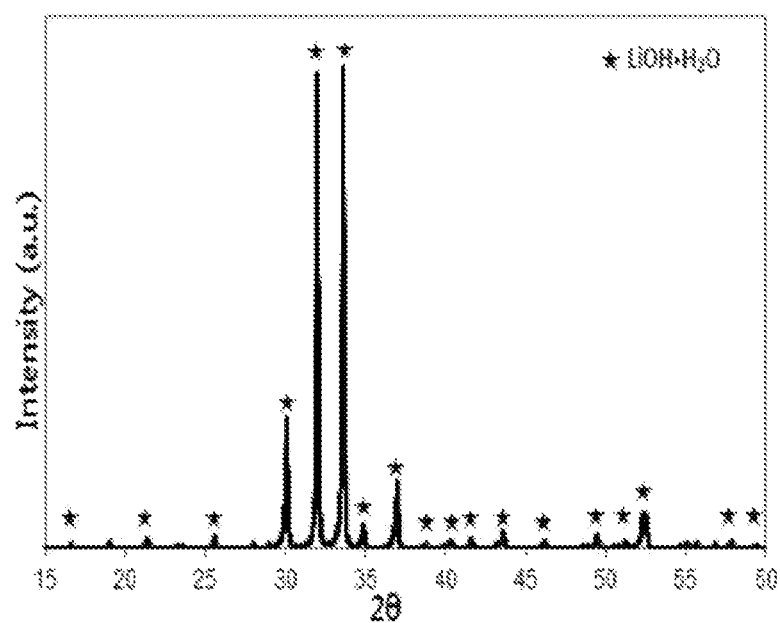
FIG. 2 is a graph illustrating XRD analysis results of lithium hydroxide monohydrate obtained by the production method according to one embodiment of the present invention.

FIG. 1 is a flowchart illustrating a method of producing lithium hydroxide from lithium concentrates through addition of sodium sulfate and roasting, according to one embodiment of the present invention, and FIG. 2 is a graph illustrating XRD analysis results of lithium hydroxide monohydrate obtained by the production method according to one embodiment of the present invention.

Referring to FIG. 1, the method of producing lithium hydroxide from lithium concentrates through sodium sulfate addition and roasting, according to the present invention, features inclusion of: a lithium concentrate preparation step of preparing a concentrate containing lithium; a mixing and roasting step of mixing the lithium concentrate with sodium sulfate and roasting the mixture; a water leaching step of leaching the roasted mixture with water under stirring; a solid-liquid separation step of separating the water-leached mixture into a leachate and residues; a concentration step of concentrate the leachate in which lithium is dissolved to produce a concentrated solution; a sodium hydroxide mixing step of adding sodium hydroxide (NaOH) to the concentrated solution and stirring the mixture; a cooling crystallization step of cooling the sodium hydroxide mixture to precipitate sodium sulfate crystals using a change in solubility; a lithium hydroxide solution recovery step of recovering a lithium hydroxide solution by the mixture resulting from the cooling crystallization into a precipitate and the lithium hydroxide solution; a concentration crystallization step of concentrating the lithium hydroxide solution to crystallize lithium hydroxide and of recovering lithium hydroxide monohydrate crystals; and a washing and drying step of water-washing and drying the lithium hydroxide monohydrate crystals to recover lithium hydroxide monohydrate.

As technology for recovering lithium from lithium concentrates to produce lithium hydroxide, a method of producing lithium hydroxide from lithium concentrate through sodium sulfate addition and roasting, according to one embodiment of the present invention, includes step S100 in which a lithium concentrate that is a concentrate containing lithium is prepared.

The lithium concentrate is preferably at least one material selected from the group consisting of spodumene ($Li_2OAl_2O_3 4SiO_2$), lepidolite ($KLiAl\,(OH,F)_2Al(SiO_4)_3$), petalite ($LiAl(Si_2O_5)_2$), amblygonite ($LiAl(F,OH)PO_4$), zinnwaldite ($Li_2K_2Fe_2Al_4Si_7O_{24}$), triphylite ($Li(Fe,Mn)PO_4$), and lithiophilite($Li(Mn,Fe)PO_4$).

Next, in step S200 (lithium concentrate mixing and roasting step), the prepared lithium concentrate is mixed with sodium sulfate and is roasted.

The lithium concentrate mixing and roasting step S200 is a process of transforming crude lithium present in the lithium concentrate into water-soluble lithium. In this step, the reaction shown in Reaction Formula 1 occurs.

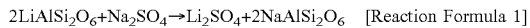

$$2LiAlSi_2O_6 + Na_2SO_4 \rightarrow Li_2SO_4 + 2NaAlSi_2O_6 \quad \text{[Reaction Formula 1]}$$

In the reaction, heat treatment is performed at a temperature that is maintained in a range of 850° C. to 1300° C. for 20 minutes to 300 minutes.

Next, in step S300 (water leaching step, water is mixed and stirred with the products resulting from the mixing and roasting step.

In the water leaching step S300, water is used for leaching, instead of an acid. In this case, the amount of water that is added is about one to 100 times the mass of the resultant products of the mixing and roasting step. During this step, the stirring is performed in a temperature range of 20° C. to 100° C. and a rotation speed range of 200 to 1000 for 1 to 5 hours.

That is, in the water leaching step S200, lithium sulfate produced through the lithium concentrate mixing and roasting step S200 reacts as represented by Reaction Formula 2.

$$Li_2SO_4 + H_2O \rightarrow 2Li^+ + SO_4^{2-} + H_2O \quad \text{[Reaction Formula 2]}$$

Next, in step S400 (solid-liquid separation step), the liquid-slurry mixture resulting from the water leaching step is separated into a leachate (in liquid phase) in which lithium is dissolved and slurry (i.e., residues in solid phase).

In this step, insoluble elements such as sodium, aluminum, and silicon are separated in the form of slurry (residues) and lithium is separated in the form of leachate.

Next, in Step S500 (concentration step), the leachate in which lithium is dissolved is concentrated through evaporation.

In the concentration step S500, the leachate is evaporated for 30 minutes to 10 hours at a temperature of 60° C. to 120° C. in a vacuum condition such that the concentration of lithium in the resulting concentrated solution becomes 16 g/L to 30 g/L.

Next, in step S600 (sodium hydroxide mixing step), sodium hydroxide (NaOH) is added to the concentrated solution and is then stirred at a temperature of 20° C. to 100° C. for 15 minutes to 2 hours to completely dissolve the added sodium hydroxide.

Next, in step S700 (cooling crystallization step), the sodium hydroxide mixture is cooled such that sodium sulfate crystals precipitate due to a change in solubility according to temperature.

In the cooling crystallization step S700 in which the mixture is cooled to precipitate crystals, the mixture is stirred at a temperature of 10° C. to −10° C. for 15 minutes to 10 hours to precipitate sodium sulfate decahydrate crystals ($Na_2SO_4 \cdot 10H_2O$).

Next, in step S800 (lithium hydroxide solution recovery step), the mixture resulting from the cooling crystallization step is separated into a solid phase (precipitate) and a liquid phase which is a lithium hydroxide solution.

In the lithium hydroxide solution recovery step S800, the mixture resulting from the cooling crystallization step is maintained at a temperature in a temperature range of room temperature to −10° C. so that the mixture is separated into the precipitate and the lithium hydroxide solution.

Next, in step S900 (concentration crystallization step), the lithium hydroxide monohydrate solution is concentrated for crystallization of lithium hydroxide. Through this step, lithium hydroxide monohydrate is obtained.

In the concentration crystallization step (S900), the lithium hydroxide solution obtained through the solid-liquid separation is evaporated at a temperature in a range of 60° C. to 120° C. for 30 minutes to 10 hours to precipitate lithium hydroxide monohydrate, and the lithium hydroxide monohydrate in the form of crystals is recovered.

That is, the more water in the solution evaporates, the higher the concentration of lithium hydroxide in the solution. When the concentration of lithium hydroxide in the solution exceeds the solubility of lithium hydroxide, lithium hydroxide precipitates. That is, lithium hydroxide crystals are generated.

Next, in step S1000, the lithium hydroxide monohydrate crystals are washed with water and then dried to recover the target product which means lithium hydroxide monohydrate.

Example

Lithium Concentrate Preparation Step (S100)

Spodumene ($Li_2O \cdot Al_2O_3 \cdot 4SiO_2$) in an amount of 30 g was prepared and used as a lithium concentrate.

The contents of respective elements contained in the prepared spodumene are measured through inductively coupled plasma-optical emission spectroscopy (ICP-OES). Table 1 below shows the results of the analysis.

TABLE 1

| substance | Si | Al | Li | Ca | K | Na | Fe | Mn | Mg |
|---|---|---|---|---|---|---|---|---|---|
| content (wt %) | 28.5 | 12.6 | 2.71 | 1.32 | 1.12 | 0.88 | 0.26 | 0.11 | 0.05 |

Lithium Concentrate Mixing and Roasting Step (S200)

Next, 8.3 g of sodium sulfate powder which corresponds to a 1:1 ratio with respect to the content of lithium oxide ($Li_2O$) contained in the prepared lithium concentrate (spodumene) was mixed with the entire amount of the prepared spodumene, the mixture was put into a box-type calcining furnace, the temperature of the furnace was raised to 1050° C.±10° C. at a heating rate of 5° C. per minute, and the reached temperature was maintained for 30 minutes. After the isothermal period for 30 minutes was over, natural cooling was performed to obtain the mixture of the prepared lithium concentrate and the added sodium sulfate. During the mixing and roasting processes, no gas was injected into the furnace.

Water Leaching Step (S300)

Next, 36.69 g of water was added to 36.69 g of the resultant mixture obtained through the mixing and roasting step, followed by stirring at room temperature at 550 rpm for 60 minutes to recover lithium. For the stirring process, a magnetic stirrer was used.

Solid-Liquid Separation Step (S400)

Next, the water-leached mixture was separated into a solid phase and a liquid phase containing lithium. Specifically, lithium-containing leachate and the residues were obtained. The chemical composition of the leachate was analyzed through ICP-OES. The results are shown in Table 2 below.

TABLE 2

| substance | Li | S | Na | Al | Ca | Si | Mn | Fe | Mg |
|---|---|---|---|---|---|---|---|---|---|
| content (ppm) | 15874 | 55609 | 3425 | 1548 | 654 | 108 | 66 | 61 | 9 |

Referring to Table 2, it can be seen that the recovery rate of lithium is high to the extent of about 70%.

Concentration Step (S500)

Next, the leachate in which lithium is dissolved in a concentration of 15.9 g/L was evaporated so that a concentrated solution in which the concentration of lithium is 30 g/L was obtained.

Sodium Hydroxide Mixing Step (S600)

Next, sodium hydroxide was added to and mixed with the concentrated solution through stirring at room temperature for 30 minutes such that the lithium sulfate and the sodium hydroxide were completely ionized.

Cooling crystallization Step (S700)

Next, the resulting solution was cooled to 10° C. or below so that sodium sulfate decahydrate crystals precipitated due to a decrease in the solubility of sodium sulfate, which depends on temperature. The solubility of each of lithium hydroxide and sodium sulfate according to temperature is shown in Table 3 below.

TABLE 3

| temperature | solubility (g/100 mL) | |
|---|---|---|
| (° C.) | LiOH | $Na_2SO_4$ |
| 0 | 12.7 | 4.9 |
| 10 | 12.7 | 9.1 |
| 20 | 12.8 | 19.5 |

Lithium Hydroxide Solution Recovery Step (S800)

Next, the resultant of the cooling crystallization underwent a solid-liquid separation process so that sodium sulfate decahydrate crystals (precipitate) and a lithium hydroxide solution were obtained through the separation process.

Concentration Crystallization Step (S900)

Next, the lithium hydroxide solution was evaporated for crystallization of lithium hydroxide. The obtained crystals were washed with water and then dried, thereby obtaining lithium hydroxide monohydrate that can be suitably used as a material for the cathode material of a secondary battery.

FIG. 2 illustrates the results of XRD analysis of lithium hydroxide monohydrate obtained according to Example of the present invention. The analysis results show that pure lithium hydroxide monohydrate is obtained.

Comparative Example

In the same manner as in Example described above, 30 g of spodumene was prepared as a lithium concentrate, the prepared spodumene was put into a box-type furnace, and the temperature in the furnace was raised to 1050° C.±10° C. at a heating rate of 5° C. per minute and then the reached temperature was maintained for 30 minutes for roasting, followed by natural cooling.

Next, sulfuric acid in an amount that corresponds to a 1:1 ratio with respect to the content of lithium oxide ($Li_2O$) in the prepared lithium concentrate (spodumene) was mixed with the roasted spodumene, the mixture was put into an electric furnace, and the temperature of the furnace was raised to 250° C.±10° C. at a heating rate of 5° C. per minute, and the reached temperature was maintained 30 minutes, followed by natural cooling.

Next, water was mixed with the resultant in the same ratio as in Example described above. Thus, lithium was recovered through water leaching. In the process, a magnetic stirrer was used to stir the mixture at 550 rpm for 60 minutes, and lithium was recovered.

After the water leaching, solid-liquid separation was performed to obtain a leachate. Next, the concentration of lithium in the leachate was measured through ICP-OES. In this case, the recovery rate of lithium was calculated to be 65.5%.

With reference to Example and Comparative Example, it was found that lithium in a lithium concentrate could transformed into a water-soluble material and recovered through sodium sulfate addition and roasting, without using the sulfuric acid leaching process, which is a conventional process.

The method of producing lithium hydroxide from a lithium concentrate through sodium sulfate addition and roasting, according to the present invention described above, can recover lithium at a high recovery rate by adding sodium sulfate to the lithium concentrate and roasting the lithium concentrate. The method can selectively extract lithium ions and produce lithium hydroxide monohydrate, without using an acid.

In addition, the method can effectively produce sodium hydroxide monohydrate through sodium hydroxide addition and cooling crystallization without using a lithium carbonate conversion process that is typically used in the related art.

Although the present invention has been described with reference to the preferred example, the ordinarily skilled in the art will appreciate that the present invention is not limited to the example described above and can be diversely changed and modified without departing from the scope of the spirit of the present invention.

The invention claimed is:

1. A method of producing lithium hydroxide from a lithium concentrate through sodium sulfate addition and roasting, the method comprising:
    preparing a lithium-containing concentrate;
    mixing sodium sulfate to the lithium-containing concentrate and roasting the lithium-containing concentrate mixed with the sodium sulfate to form a roasted lithium-containing concentrate mixture;
    leaching the roasted lithium-containing concentrate mixture with water under stirring; wherein an acid is not added during the leaching step, and the water is added during the leaching step in an amount that is one to ten times the mass of the roasted lithium-containing concentrate mixture,
    performing solid-liquid separation to separate a resultant of the leaching into a leachate in which lithium is dissolved and residues;
    concentrating the leachate in which lithium is dissolved in a process of evaporating the leachate at a temperature in a range of 60° C. to 120° C., at a vacuum pressure, for 30 minutes to 10 hours such that the concentration of lithium in the leachate becomes 16 g/L to 30 g/L;

mixing sodium hydroxide (NaOH) with the concentrated solution under stirring to give a sodium hydroxide mixture;

performing cooling crystallization to precipitate sodium sulfate using a change in solubility by cooling the sodium hydroxide mixture;

recovering a lithium hydroxide solution by separating a resultant of the cooling crystallization into a precipitate and the lithium hydroxide solution;

performing concentration crystallization to recover lithium hydroxide monohydrate crystals by concentrating the lithium hydroxide solution; and washing and drying the lithium hydroxide monohydrate crystals to recover dried lithium hydroxide monohydrate crystals.

2. The method according to claim 1, wherein the lithium-containing concentrate includes one or more ones selected from the group consisting of spodumene ($Li_2OAl_2O_3 4SiO_2$), lepidolite ($KLiAl(OH,F)_2Al(SiO_4)_3$), petalite ($LiAl(Si_2O_5)_2$), amblygonite ($LiAl(F,OH)PO_4$), zinnwaldite ($Li_2K_2Fe_2Al_4Si_7O_{24}$), triphylite ($Li(Fe,Mn)PO_4$), and lithiophilite($Li(Mn,Fe)PO_4$).

3. The method according to claim 1, wherein during the mixing and roasting, a reaction represented by $2LiAlSi_2O_6 + Na_2SO_4 \rightarrow Li_2SO_4 + 2NaAlSi_2O_6$ (Reaction Formula 1) occurs, and heat treatment is performed while a reaction temperature is maintained in a range of 850° C. to 1300° C. for 20 to 300 minutes.

4. The method according to claim 1, wherein during the leaching, the roasted lithium-containing concentrate mixture is stirred at a temperature in a range of 20° C. to 100° C. at a speed in a range of 200 to 1000 rpm for 1 to 5 hours.

5. The method according to claim 1, wherein the mixing of the sodium hydroxide comprises a process of adding sodium hydroxide (NaOH) to the concentrated solution and of stirring the resulting mixture at a temperature in a range of 20° C. to 100° C. for 15 minutes to 2 hours to completely dissolve the sodium hydroxide.

6. The method according to claim 1, wherein the cooling crystallization comprises a process of precipitating sodium sulfate decahydrate ($Na_2SO_4 \cdot 10H_2O$) crystals by cooling the sodium hydroxide mixture to a temperature in a range of 10° C. to −10° C. and by stirring the sodium hydroxide mixture for a duration of 15 minutes to 10 hours.

7. The method according to claim 1, wherein the recovering of the lithium hydroxide comprises a process of maintaining the temperature of the mixture resulting from the cooling crystallization in a temperature range of −10° C. to room temperature such that the mixture is separated into the leachate and the lithium hydroxide solution.

8. The method according to claim 1, wherein the concentration crystallization comprises a process of evaporating the lithium hydroxide solution at a temperature in a range of 60° C. to 120° C. for 30 minutes to 10 hours to concentrate the lithium hydroxide solution, thereby precipitating lithium hydroxide monohydrate through evaporation concentration and recovering the lithium hydroxide monohydrate as crystals.

9. The method according to claim 1, wherein the washing and drying comprises a process of washing the lithium hydroxide monohydrate crystals with water, then drying the washed lithium hydroxide monohydrate crystals, and recovering the lithium hydroxide monohydrate crystals that is a target product to be obtained.

* * * * *